United States Patent [19]
Webster

[11] Patent Number: 5,874,493
[45] Date of Patent: *Feb. 23, 1999

[54] STABILIZATION OF POLYOLEFINS

[75] Inventor: Joseph R. Webster, Charlotte, N.C.

[73] Assignee: Clariant Finance (BVI) Limited, Tortola, Virgin Islands (Br.)

[21] Appl. No.: 833,149

[22] Filed: Apr. 4, 1997

Related U.S. Application Data

[60] Provisional application No. 60/015,649 Apr. 12, 1996.
[51] Int. Cl.⁶ .................................................... C08K 5/34
[52] U.S. Cl. ............................ 524/102; 524/217; 524/219
[58] Field of Search .................................... 524/102, 217, 524/219

[56] References Cited

U.S. PATENT DOCUMENTS

| | | | |
|---|---|---|---|
| 4,110,304 | 8/1978 | Gilg et al. | 524/91 |
| 4,876,299 | 10/1989 | Avar | 524/103 |

FOREIGN PATENT DOCUMENTS

| | | | |
|---|---|---|---|
| 2269819 | 2/1994 | United Kingdom . | |

*Primary Examiner*—Kriellion S. Morgan
*Attorney, Agent, or Firm*—Miles B. Dearth

[57] ABSTRACT

The subject matter of the invention is the use of certain piperidine compounds of formula I

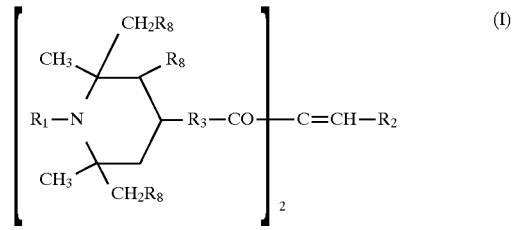

in combination with an oxalanide UV absorber for the stabilization of pigmented or unpigmented polyolefins against the negative consequences of UV radiation. The invention also relates to compositions comprising a piperidine compound of formula I, a polyolefin, and an oxalanide UV absorber and compositions comprising a compound of formula I and a second HALS compound.

11 Claims, No Drawings

STABILIZATION OF POLYOLEFINS

This is a continuation of provisional application Ser. No. 60/015,649 filed Apr. 12, 1996 (abandoned).

The subject matter of the invention is the use of certain piperidine compounds of formula I in combination with an oxanilide UV absorber for the stabilization of pigmented or unpigmented polyolefins against the negative consequences of light, in particular UV radiation (290–420 nm). The invention also relates to a composition comprising a piperidine compound of formula I, a pigmented or unpigmented polyolefin, and an oxanilide UV absorber. A further object of the invention is a process for the stabilization of pigmented or unpigmented polyolefins against the negative consequences of light which comprises adding to said polyolefins a quantity sufficient for stabilization of at least one piperidine compound of formula I and an oxanilide UV absorber.

Polyolefins, either pigmented or unpigmented, can be damaged by energy introduced in the form of light. Pigments are insoluble or extremely poorly-soluble dyestuffs which contain groups of atoms normally referred to as chromophoric groups, which create the color quality of molecules, and auxochromic groups, which themselves do not create any color but strengthen the intensity and depth of color. The invention also concerns the color fastness of pigments. For example, in a colored, ready-made article, which during the course of its use is subjected to the influence of natural or artificial light, especially the UV part thereof, the established shade is altered, or its intensity, i.e. depth of color, is reduced.

It is therefore an aim of the invention to improve the light fastness and color intensity of pigmented polyolefins and the usage period of the pigmented finished articles.

It is known that compounds of the HALS type (HALS= hindered amine light stabilizer) react as radical traps, and are therefore used for the stabilization of polymeric substrates. However, these commercial HALS compounds do not have specific, light-stabilizing activity on pigments. It has surprisingly been found that the presence of piperidine compounds of formula I in combination with UV absorbers, especially oxanilide UV absorbers, substantially improves the stability of polyolefins against the adverse effects of light.

The subject matter of the invention is thus a composition comprising:

a) a polyolefin;
b) a piperidine compound of formula I

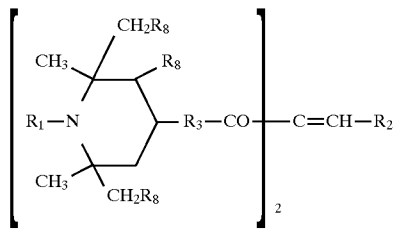

wherein
$R_1$ is hydrogen, hydroxyl, low molecular weight alkyl, low molecular weight alkoxy, or acyl;
$R_2$ is a mono- or binuclear aromatic group which optionally bears substituents;
$R_3$ is oxygen, —NH— or —N($C_{1-4}$-alkyl)—; and each $R_8$, independently of one another, is hydrogen or methyl; and c) an oxanilide UV absorber.

All the $R_8$'S preferably are hydrogen.

Another embodiment of the invention is a composition as described above wherein a) is polypropylene, polyethylene, or a copolymer thereof;
$R_1$ is hydrogen, $C_{1-8}$-alkyl, $C_{1-8}$-alkoxy, formyl, acetyl, or propionyl;
$R_2$ is benzene, naphthalene, or a nitrogen and/or sulphur containing five- or six-membered ring, which is optionally anellated to a benzene ring;
$R_3$ is oxygen, —NH—, or —N—($C_{1-4}$-alkyl);
$R_8$ is hydrogen; and
c) is 2-ethyl-2'-ethoxy-oxanilide or N-(2-ethoxyphenyl)-N'-(4-isododecylphenyl) ethanediamide.

Another embodiment of the invention is a composition comprising b) and c), as defined above, in the range of ratios (wt/wt.) of 4:1 to 1:4, especially 3:1, 2:1, 1:1, 1:2, and 1:3. These compositions may also comprise one or more additional HALS compounds, UV absorbers, primary and secondary antioxidants, and antacids (i.e., acid acceptors).

Another embodiment of the invention is a composition comprising a piperidine compound of formula I and a second HALS compound in the range of ratios (wt./wt.) of 3:1 to 1:3, especially 2:1, 1:1, and 1:2. Said second HALS include commercially available products such as Tinuvin 123 and 622, Chimassorb 944 and 119, HA88, and Uvisil 299 and 2000.

The following compounds of formula Ia are preferred

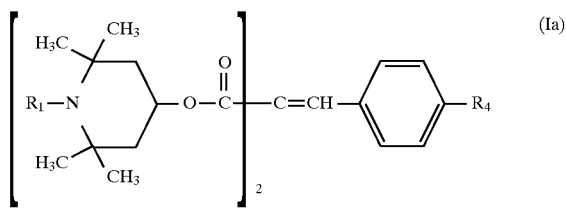

wherein
$R_1$ is $CH_3$, $OC_8H_{17}$, $C(O)CH_3$, or p-$C_{1-8}$alkoxy-substituted benzene; and
$R_4$ is H or $OCH_3$ Most preferred is a compound of formula Ia wherein $R_1$ is $CH_3$ and $R_4$ is $OCH_3$.

The compounds of formula I may be prepared by methods taught in GB 2,269,819, published Feb. 23, 1994 and DE 3,412,227, published Oct. 11, 1984.

The polyolefins are preferably polypropylene, polyethylene, and copolymers thereof.

The polypropylene is preferably polypropylene fiber and thick section polypropylene.

Polypropylene fiber means the unit that forms the basic element of fabrics and other textile structures and is characterized by having a length at least 50 times its diameter or width. The term, as used herein, includes fibers, yarns, slit tapes, and fabrics. Thick section polypropylene means a polypropylene article having a thickness or diameter of at least 20 mils or from 600 to greater than 1000 microns.

"Low molecular weight alkyl" means groups with 1 to 8, especially 1 or 2, carbon atoms, "Acyl" means the radicals of formic, acetic, or propionic acid.

The mono- or binuclear aromatic group $R_2$ are, e.g., benzene, naphthalene, and nitrogen and/or sulphur containing five- or six-membered rings, which are optionally anellated to a benzene ring, and which bear, e.g., a sterically hindered hydroxyl as a substituent (3,5-ditert.-butyl-4-hydroxyphenyl), or a thienyl group. Aromatic six-membered rings are preferred. The substituents which may be present on these rings are, e.g., hydroxyl, low molecular weight alkyl or alkoxy, preferably methyl, tert.-butyl, methoxy, ethoxy, hydroxyl, and one or two groups of formula

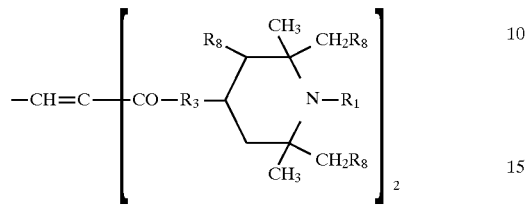

In addition to the piperidine compounds of formula I and the oxanilide UV absorber, further commercial additives may be additionally employed in the polyolefin substrates, such as primary or secondary anti-oxidants or mixtures thereof, secondary aromatic amines, thioethers, phosphorus compounds, biocides, metal deactivators, further HALS compounds, further UV absorbers, anti-static agents, and the like, as well as various finishing assistants or inert filler materials, e.g. talcum, mica, $TiO_2$, chalk, glass, barite, acid acceptors (antacids) etc.

The metal deactivators include commercially available compounds such as Irganox 1024 and Naugard XL-1.

The UV absorbers include hydroxy-substituted benzophenones such as Cyasorb UV 9, 24, 207, 284, 416, 531, and 2126; Uvinul 3000, 3008, 3040, 3049, 3050, and 3060; hydroxy-substituted benzotriazoles such as Cyasorb 5411 and Tinuvin 234, 326, 327, 328, 384, 900, and 1130; triazines such as Cyasorb 1164 and 1164(L), Tinuvin 1577, and Uvinul T-150; salicylic acid ester; formamidine; cyanoacrylates such as Uvinul 3038 and 3039; and benzyldenmalonate esters such as Cyasorb 1988.

The acid acceptors include metallic oxides and stearates and MgAlOH carbonates. Finished articles stabilized according to the invention are superior to articles according to the prior art in respect of their substantially longer period of use.

The compound of formula I (b) and the UV absorber (c) or a composition comprising (b) and (c) may be added to the pigmented or unpigmented polyolefin substrate before, during or, after the manufacture thereof. Pigments are intended to include all organic and inorganic (e.g., Ultramarine Blue, $TiO_2$) pigments.

The concentration of the piperidine compound of formula I is 0.01 to 2% by weight, preferably 0.1 to 1%, based on polyolefin a). The concentration of UV absorber c) is 0.01 to 1% by weight, preferably 0.05 to 1%, most preferably 0.1 to 0.6%, based on polyolefin a). The concentration of a composition comprising a piperidine compound of formula I and a second HALS compound in the range of ratios of 3:1 to 1:3 is 0.01 to 1% by weight, based on polyolefin a). The addition of the pigmentation to polyolefin may be effected in accordance with generally conventional processes in pure form as so-called full pigments, in pre-dispersed form as concentrates, masterbatches and the like, or in combination with further admixtures.

A further object of the invention is a process for the stabilization of pigmented or unpigmented polyolefins against the negative consequences of light which comprises adding to said polyolefins a quantity sufficient for stabilization of at least one piperidine compound of formula I and an oxanilide UV absorber c).

In the following examples which illustrate the invention, the parts and percentages are by weight, and the degrees are degrees celsius.

EXAMPLE 1

UV Stability

To test the stability of polypropylene treated with the composition of the invention against the adverse effects of UV radiation, tests were conducted on 600/34 natural yarns (18 dpf) treated as follows:

A melt compounded masterbatch of 10% (wt.) HALS (either one or a combination of HALS) was prepared and let down into a 8 MF (melt flow in g/10 minutes) polypropylene homopolymer and melt compounded (i.e., extrusion compounded) at 216°–221° C. into pelletized form. The pelletized resin contained either HALS alone or in combination with UVA. An appropriate amount of pelletized resin was melt extruded into 18 dpf fibers at 265° C. to yield the various concentrations of test materials and prepared into fabric.

The compounds used were:

HALS 1 is Chimassorb 944, poly[[β-[1,1,3,3-tetramethyl butyl) amino]-s-triazine-2,4-diyl][[2,2,6,6-tetramethyl4-piperidyl)imino]hexamethylene [(2,2,6,6,-tetramethyl-4-piperidyl)imino]]

HALS 2 is Chimassorb 119, 1,3,5-triazine-2,4,6-triamine, N,N'''-[1,2-ethanediylbis[[[4.6-bis[butyl (1,2,2,6,6-pentamethyl-4-piperidinyl)amino]-1,3,5-triazine-2-yl] imino]-3,1 propanedyl]]-bis[N',N''-dibutyl-N',N''-bis (1,2,2,6,6-pentamethyl-4-piperidinyl)-

HALS 3 is Tinuvin 123, bis-(1-octyloxy-2,2,6,6, tetramethyl-4-piperidinyl)sebacate Sanduvor® PR-31 is a compound of the formula Ia where $R_1$ is —$OCH_3$ and $R_4$ is methyl, propanedioic acid, [(4-methoxyphenyl)methylene]-bis(1,2,2,6,6-pentamethyl4-piperidinyl)ester UVA1 is Ferro AM 340, benzoic acid, 3,5-bis(1,1-dimethylethyl)4-hydroxy-, 2,4-bis(1,1-dimethylethyl) phenyl ester UVA2 is Tinuvin 234, 2-(2H-benzotriazol-2-yl)-4,6- bis (1-methyl-1-phenylethyl)phenol Sanduvor® VSU is 2-ethyl-2'-ethoxy-oxanilide The tests were run using test standard SAE J 1885 at 89° C. and a high temperature xenon lamp. Test results are in $KJ/m^2$ to degradation. The data demonstrate that PR-31 alone (test 3) or in combination with another HALS compound, especially an aminoether type HALS such as Tinuvin 123, enhances polypropylene stability against the degradation by UV light when compared to combinations of other HALS compounds (e.g., compare tests 5 and 6) and that PR-31 also enhances this stability when used in combination with a UV absorber (e.g., compare tests 9 and 10), the best of which absorbers is Sanduvor® VSU (e.g., compare tests 12, 13, and 14).

®Sanduvor is a registered trademark of Sandoz Ltd.

TABLE 1-1

| | % Additive Used | | | | | | | |
|---|---|---|---|---|---|---|---|---|
| | 1 | 2 | 3 | 4 | 5 | 6 | 7 | 8 |
| HALS 1 | 0.6 | | | | | | | |
| HALS 2 | | 0.6 | | | 0.3 | | 0.3 | |
| HALS 3 | | | | 0.6 | 0.3 | 0.3 | | |
| Sanduvor PR-31 | | | 0.6 | | | 0.3 | | 0.3 |
| UVA 1 | | | | | | | 0.3 | 0.3 |
| UVA 2 | | | | | | | | |
| Sanduvor VSU | | | | | | | | |
| Results | 902.4 | 1353.6 | 1466.4 | 1128 | 1240.8 | 1579.2 | 676.8 | 1466.4 |
| | 9 | 10 | 11 | 12 | 13 | 14 | 15 | 16 |
| HALS 1 | | | | | | | | |
| HALS 2 | 0.3 | | 0.3 | | 0.3 | | 0.6 | |
| HALS 3 | | | | | | | | |
| Sanduvor PR-31 | | 0.3 | | 0.3 | | 0.3 | | 0.6 |
| UVA 1 | | | | | | | | |
| UVA 2 | | | | | 0.3 | 0.3 | | |
| Sanduvor VSU | | 0.3 | 0.3 | | | | 0.3 | 0.3 |
| Results | 564 | 1240.8 | 902.4 | 1804.8 | 564 | 1466.4 | 564 | 2594.4 |

EXAMPLE 2

Pigmented Fiber

To test the stability of pigmented polypropylene with the compositions of the invention, an 8 dpf automotive fiber was prepared pigmented with 1.0% to $TiO_2$. The tests were run using test standard Amoco Fabrics & Fibers Internal Scratch Test Method. Test results (HTX) are in hours to failure.

TABLE 2-1

| Test | HALS 0.72% | UVA 0.36% | HTX |
|---|---|---|---|
| 1 | PR-31 | VSU | 3853 |
| 2 | HALS2 | UVA2 | 2594 |

What is claimed is:

1. A composition comprising:
   a) a polyolefin;
   b) a piperidine compound of formula I

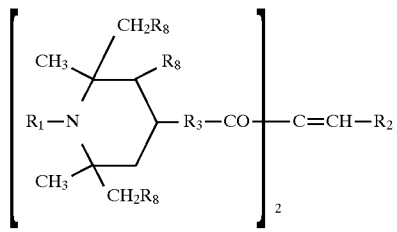

(I)

wherein
$R_1$ is hydrogen, hydroxyl, low molecular weight alkyl, low molecular weight alkoxy, or acyl;
$R_2$ is a mono- or binuclear aromatic radical
$R_3$ is oxygen, —NH—, or —N($C_{1-4}$-alkyl)—; and each $R_8$, independently of one another, is hydrogen or methyl; and
   c) an oxanilide UV absorber.

2. A composition of claim 1, wherein
   a) is polypropylene, polyethylene, or a copolymer thereof;
   $R_1$ is hydrogen, $C_{1-8}$-alkyl, $C_{1-8}$-alkoxy, formyl, acetyl, or propionyl;
   $R_2$ is benzene, naphthalene, or a nitrogen and/or sulphur containing five- or six-membered ring, which is optionally anellated to a benzene ring;
   $R_3$ is oxygen, —NH—, or —N—($C_{1-4}$-alkyl);
   $R_8$ is hydrogen; and
   c) is 2-ethyl-2'-ethoxy-oxanilide or N-(2-ethoxyphenyl)-N'-(4-isododecyphenyl)ethanediamide.

3. A composition of claim 2, wherein the piperidine compound is formula Ia

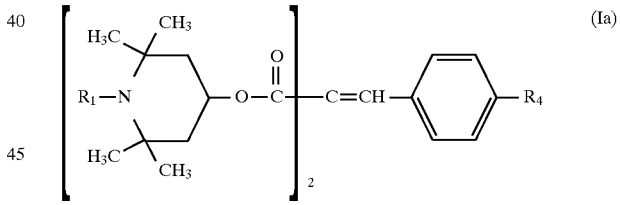

(Ia)

wherein
   a) is a polypropylene;
   $R_1$=H, $CH_3$, $OC_8H_{17}$, $C(O)CH_3$, or p-$C_{1-8}$-alkoxy-substituted benzene;
   $R_4$=H or $OCH_3$; and
   c) is 2-ethyl-2'-ethoxy-oxanilide.

4. A composition of claim 3 wherein $R_1$ is $CH_3$ and $R_4$ is $OCH_3$.

5. A compound of claim 1, wherein the concentration of piperidine compound b) is 0.01 to 2% by weight, preferably 0.1 to 1%, based on polyolefin a); and the quantity of UV absorber is 0.01 to 1% by weight, preferably 0.05 to 1%, more preferably 0.1 to 0.6%, based on polyolefin a).

6. A composition of claim 1, wherein the substrate is polypropylene fiber or thick section polypropylene.

7. A composition of claim 1, wherein the polyolefin contains admixtures selected from the group consisting of anti-oxidants, finishing assistants, further light-protection agents, fillers, strengthening agents, and adjuvant substances.

8. A composition of claim 1 wherein the polyolefin contains organic or inorganic pigments.

9. A composition prepared by a process which comprises mixing
a) a polyolefin;
b) A piperidine compound of formula I

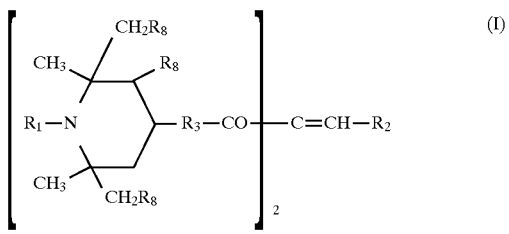

wherein
$R_1$ is hydrogen, hydroxyl, low molecular weight alkyl, low molecular weight alkoxy, or acyl;
$R_2$ is a mono- or binuclear aromatic radical
$R_3$ is oxygen, —NH—, or —N($C_{1-4}$-alkyl)—; and each $R_8$, independently of one another, is hydrogen or methyl; and
c) an oxanilide UV absorber.

10. A process for stabilizing a pigmented or unpigmented polyolefin against the negative consequences of light which comprises adding thereto a quantity sufficient for stabilization of a composition comprising a piperidine compound of formula I and an oxanilide UV absorber.

11. A process of claim 10, wherein
a) is polypropylene, polyethylene, or a copolymer thereof;
$R_1$ is hydrogen, $C_{1-8}$-alkyl, $C_{1-8}$-alkoxy, formyl, acetyl, or propionyl;
$R_2$ is benzene, naphthalene, or a nitrogen and/or sulphur containing five- or six-membered ring, which is optionally anellated to a benzene ring;
$R_3$ is oxygen, —NH—, or —N—($C_{1-4}$-alkyl); and
$R_8$ is hydrogen.

* * * * *